United States Patent [19]

Story et al.

[11] Patent Number: 5,774,743
[45] Date of Patent: Jun. 30, 1998

[54] SYSTEM FOR IMPLEMENTING PERIPHERAL DEVICE BUS MASTERING IN MOBILE COMPUTER VIA MICRO-CONTROLLER FOR PROGRAMMING DMA CONTROLLER, GENERATING AND SENDING COMMAND SIGNALS, AND RECEIVING COMPLETION STATUS

[75] Inventors: Franklyn H. Story, Chandler; David R. Evoy, Tempe; Peter Chambers, Scottsdale; Lonnie Goff, Tempe, all of Ariz.

[73] Assignee: VLSI Technology, Inc., San Jose, Calif.

[21] Appl. No.: 627,987

[22] Filed: Apr. 8, 1996

[51] Int. Cl.[6] .............................. G06F 9/00; G06F 13/00
[52] U.S. Cl. ..................... 395/842; 395/825; 395/827; 395/843; 395/847; 364/240.5; 364/242.31
[58] Field of Search ............................. 395/183.01, 294, 395/287, 848, 821, 290, 842, 800, 825, 827, 843, 847; 364/200, 240.5, 242.31

[56] References Cited

U.S. PATENT DOCUMENTS

| | | | |
|---|---|---|---|
| 4,901,232 | 2/1990 | Harrington et al. | 364/200 |
| 5,444,855 | 8/1995 | Thompson | 395/287 |
| 5,488,695 | 1/1996 | Cutter | 395/290 |
| 5,513,368 | 4/1996 | Garcia, Jr. et al. | 395/842 |
| 5,524,208 | 6/1996 | Finch et al. | 395/183.01 |
| 5,546,547 | 8/1996 | Bowes et al. | 395/294 |
| 5,561,821 | 10/1996 | Gephardt et al. | 395/848 |
| 5,603,050 | 2/1997 | Wolford et al. | 395/821 |
| 5,640,585 | 6/1997 | Smoot, III et al. | 395/800 |

*Primary Examiner*—Thomas C. Lee
*Assistant Examiner*—David Ton
*Attorney, Agent, or Firm*—Harry M. Weiss; Jeffrey D. Moy; Harry M. Weiss & Associates, P.C.

[57] ABSTRACT

The present invention is a system and method for implementing peripheral device bus mastering in a mobile computer system. The system uses the micro-controller of the mobile computer system to program a DMA controller. The DMA controller transfers data to and from the memory of the mobile computer system. A bus controller which is coupled to both the micro-controller and the DMA controller implements a memory data transfer request from the DMA controller and the micro-controller. A device controller, either a IDE hard disk controller or an ECP parallel port controller, is also coupled to the DMA controller and the micro-controller. The device controller receives and responds to the command signals from the micro-controller by transferring data to and from the DMA controller means and generating a completion signal when the transfer is complete.

20 Claims, 2 Drawing Sheets

SYSTEM FOR IMPLEMENTING PERIPHERAL DEVICE BUS MASTERING IN MOBILE COMPUTER VIA MICRO-CONTROLLER FOR PROGRAMMING DMA CONTROLLER, GENERATING AND SENDING COMMAND SIGNALS, AND RECEIVING COMPLETION STATUS

RELATED APPLICATIONS

This application is related to the applications entitled "SYSTEM FOR IMPLEMENTING PERIPHERAL DEVICE BUS MASTERING AND METHOD THEREFOR," Ser. No. 08/627,989, "SYSTEM AND METHOD FOR IMPLEMENTING PERIPHERAL DEVICE BUS MASTERING IN A MOBILE COMPUTER SYSTEM VIA A UNIVERSAL SERIAL BUS CONTROLLER OR AN INFRARED DATA ASSOCIATION CONTROLLER," Ser. No. 08/627,986, "A DESKTOP PERSONAL COMPUTER SYSTEM HAVING PERIPHERAL DEVICE BUS MASTERING AND METHOD THEREFOR," Ser. No. 08/627,992 AND "SYSTEM AND METHOD FOR IMPLEMENTING PERIPHERAL DEVICE BUS MASTERING IN A DESKTOP PERSONAL COMPUTER SYSTEM VIA AN INTEGRATED DRIVE ELECTRONICS HARD DISK CONTROLLER OR AN EXTENDED CAPABILITIES PORT PARALLEL PORT CONTROLLER" Ser. No. 08/627,988, filed concurrently herewith, now pending in the name of the same inventors, and assigned to the same assignee as this Application. The disclosures of the above referenced applications are hereby incorporated by reference into this application.

BACKGROUND OF THE INVENTION

1. Field of the Invention

This invention relates generally to computer systems and, more specifically, to a system and method which allows for the implementation of peripheral device bus mastering in mobile computer systems.

2. Background of the Invention

Bus mastering (i.e., the ability of input/output (I/0) devices to take over transactions on their own behalf) is becoming an important strategy in computer systems as the burden on central processing unit (CPU) bandwidth increases. Each reduction in time required by the CPU to control peripheral devices and their data flow results in an increase in available CPU bandwidth that includes operating system overhead for application interfaces and interrupt handling. This means that not only is unattended data transfers to these peripheral devices important, but so is unattended transaction initiation and completion processing. The time savings is especially enhanced when multiple transactions are handled without CPU intervention.

Bus mastering in mobile computer systems (i.e., laptops, notebooks, personal assistants, etc.) is an extremely difficult problem to solve. Since the real estate in most mobile computer systems' architectures is extremely limited, the cost associated with implementing bus mastering systems must be cost effective.

Therefore, a need existed to provide a system and method for implementing peripheral device bus mastering in a mobile computer system. The system and method for implementing peripheral device bus mastering must be cost effective and must require very little additional hardware to install. The system and method must also be able to initiate and complete the processing of unattended transactions. Furthermore, the system and method must be able to handle multiple transactions without CPU intervention thereby further enhancing the time savings of the CPU.

SUMMARY OF THE INVENTION

In accordance with one embodiment of the present invention, it is an object of the present invention to provide a system and method for implementing peripheral device bus mastering in a mobile computer system.

It is another object of the present invention to provide a system and method for implementing peripheral device bus mastering in a mobile computer system which is cost effective and requires very little additional hardware to install.

It is still another object of the present invention to provide a system and method for implementing peripheral device bus mastering in a mobile computer system which is able to initiate and complete the processing of unattended transactions.

It is a further object of the present invention to provide a system and method for implementing peripheral device bus mastering in a mobile computer system which is able to handle multiple transactions without CPU intervention.

BRIEF DESCRIPTION OF THE PREFERRED EMBODIMENTS

In accordance with one embodiment of the present invention, a system for implementing peripheral device bus mastering in a mobile computer system is disclosed. The system is comprised of a mobile computer system. The mobile computer system has Direct Memory Access (DMA) controller means for transferring data to and from memory. Micro-controller means are coupled to the DMA controller means for programming the DMA controller means, generating and sending command signals, and receiving completion status after the transfer of data is complete. Bus controller means are coupled to the DMA controller means and the micro-controller means for implementing a memory data transfer request from the DMA controller means and the micro-controller means. Device controller means are coupled to the DMA controller means and the micro-controller means for receiving and responding to the command signals from the micro-controller means, transferring long streams of the data to and from the DMA controller means, and generating and returning the completion status to the micro-controller means after the transfer is complete.

In accordance with another embodiment of the present invention, a method for implementing a system for peripheral device bus mastering in a mobile computer system is disclosed. The method comprises the steps of: providing a mobile computer system; providing Direct Memory Access (DMA) controller means coupled to the mobile computer system for transferring data to and from memory; providing micro-controller means coupled to the DMA controller means for programming the DMA controller means, generating and sending command signals, and receiving completion status after the transfer of data is complete; providing bus controller means coupled to the DMA controller means and the microcontroller means for implementing a memory data transfer request from the DMA controller means and the micro-controller means; and providing device controller means coupled to the DMA controller means and the micro-controller means for receiving and responding to the command signals from the micro-controller means, transferring long streams of the data to and from the DMA controller means, and generating and returning the completion status to the micro-controller means after the transfer is complete.

DETAILED DESCRIPTION OF THE PREFERRED EMBODIMENTS

Figure 1:
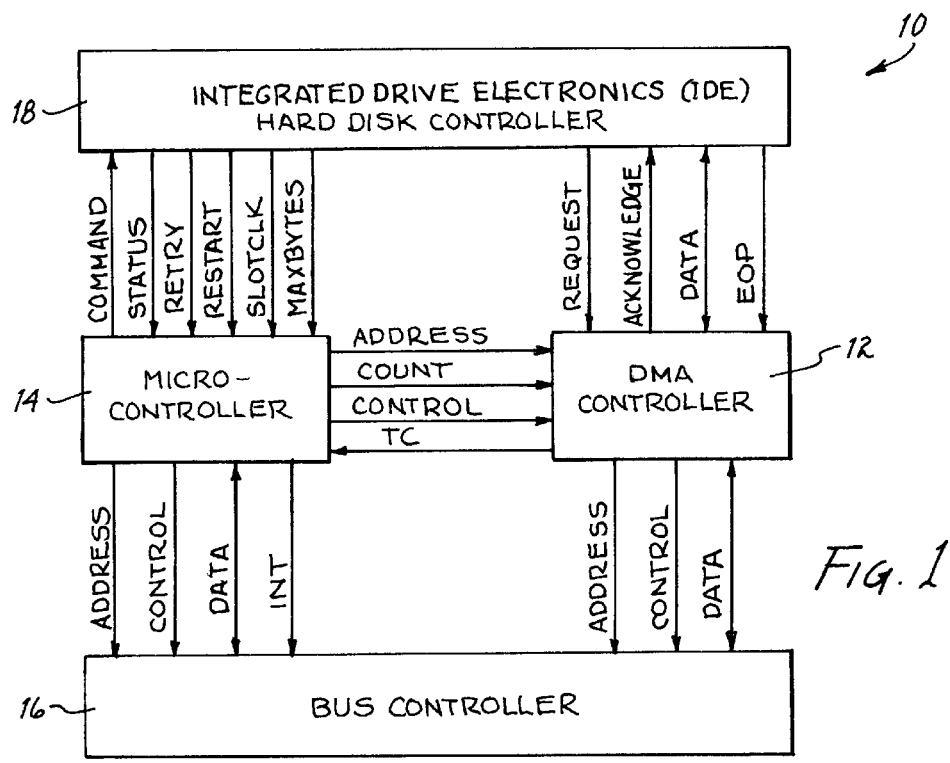
FIG. 1 is a simplified block diagram of one embodiment of a system for implementing peripheral device bus mastering in a mobile computer system.

Referring to FIG. 1, one embodiment of a system for implementing peripheral device bus mastering in a mobile computer system 10 (hereinafter system 10) is shown. The system 10 is comprised of a Direct Memory Access (DMA) controller 12. The DMA controller 12 is used for transferring data to and from the memory of the mobile computer system. In the preferred embodiment of the present invention, the DMA controller 12 is implemented as a distributed DMA target slice. Since the distributed DMA target slice is a pre-existing block, the cost associated with implementing the system 10 can be reduced.

Figure 3:
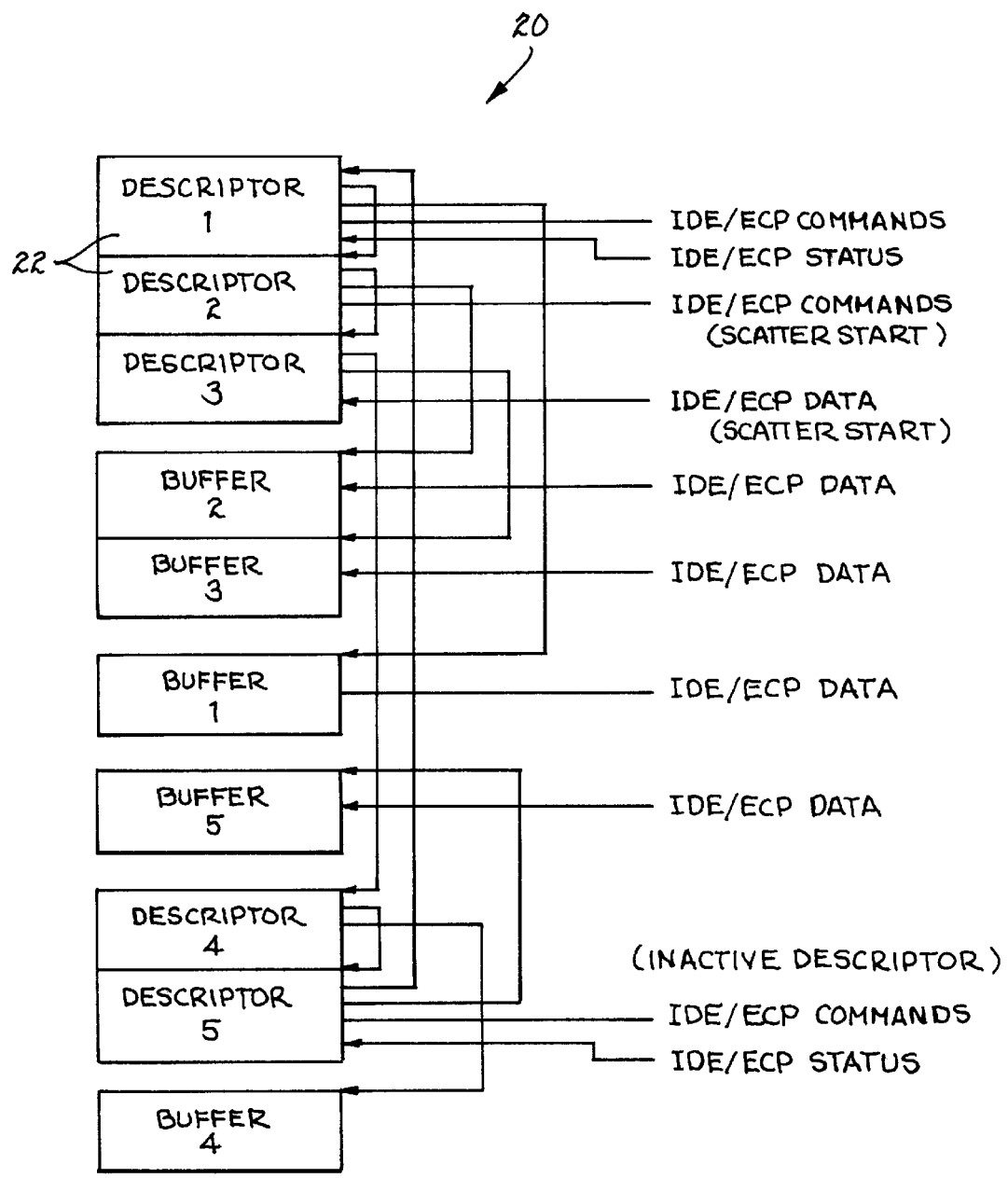
FIG. 3 is a simplified block diagram of a data buffer descriptor list used by the system depicted in FIGS. 1 and 2.

A micro-controller 14 is coupled to the DMA controller 12. The micro-controller 14 is able to program the DMA controller 12 from information stored in a data buffer descriptor list 20 (FIG. 3). The data buffer descriptor list 20 is created in the memory of the mobile computer system. Each element in the data buffer descriptor list 20 describes a data transfer that the micro-controller 14 initiates, controls, and completes. The micro-controller 14 handles the linked sequences of individual data buffer descriptors 22 (FIG. 3) by programming the DMA controller 12, generating and sending command signals, and receiving completion status after the transfer of data to or from memory is complete. It should be noted that most mobile computers (i.e., laptops, notebooks, personal assistants, etc.) are already equipped with a micro-controller 14. Therefore, the implementation of the system 10 could be implemented with the addition of very little hardware. Thus, the system 10 would require very little additional real estate to implement thereby further reducing the cost of the system 10.

A bus controller 16 is coupled to both the DMA controller 12 and the micro-controller 14. The bus controller 16 is used for implementing a memory data transfer request from the DMA controller 12 and the micro-controller 14.

According to one embodiment of the present invention, an Integrated Drive Electronics (IDE) hard disk controller 18 is coupled to both the DMA controller 12 and the micro-controller 14. The IDE hard disk controller 18 receives and responds to command signals from the micro-controller 14. In response to certain command signals, the IDE hard disk controller 18 generates long streams of data in an intermittent fashion. Normally, any single data stream is targeted to a number of different host memory locations. The ability to handle multiple memory buffers for a single data transfer and the ability to dynamically add transfer requests to the list allows for an efficient high performance interface. Upon completion of the transfer of data, the IDE hard disk controller 18 generates and returns a completion signal to the micro-controller 14.

Figure 2:
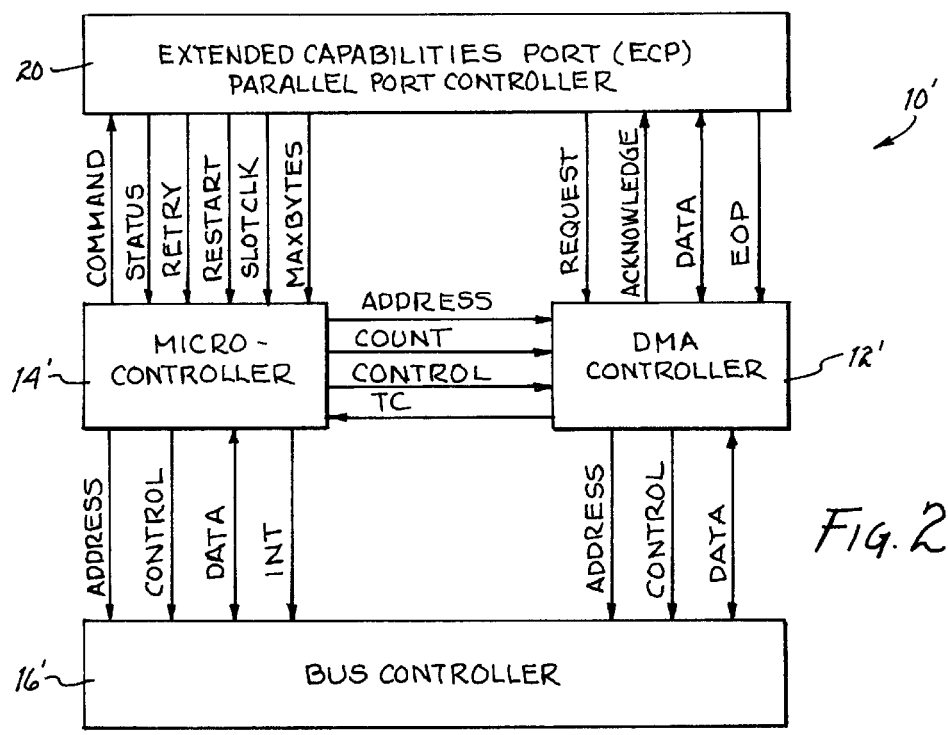
FIG. 2 is a simplified block diagram of another embodiment of the system in FIG. 1 for implementing peripheral device bus mastering in a mobile computer system.

Referring to FIG. 2, another embodiment of the present invention is shown. In this embodiment, the system 10' is comprised of a DMA controller 12', a micro-controller 14' and a bus controller 16'. The DMA controller 12', the micro-controller 14' and the bus controller 16' function as described in the above embodiment.

The main difference between the two embodiments is that the IDE hard disk controller 18 (FIG. 1) of the first embodiment is replaced by an Extended Capabilities Port (ECP) parallel port controller 20. The ECP parallel port controller 20 interfaces to a number of different peripheral devices over a parallel bus. Each of the peripheral devices appears to the system 10' as a separate and independent data path. Since the interface is parallel, the data transfer rates may be much higher, approaching hard disk rates, so the peripheral devices on the parallel bus may transfer long streams of data, as does the IDE hard disk controller 18. The intermixed characteristics of varied peripheral device types and varying data transfer rates are handled with no more difficulty than when the characteristics are not combined.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for implementing peripheral device bus mastering in a mobile computer system comprising, in combination:

mobile computer system comprising:
      Direct Memory Access (DMA) controller means for transferring data to and from memory of said mobile computer system;
      micro-controller means coupled to said DMA controller means for programming said DMA controller means, generating and sending command signals, and receiving completion status after said transfer of data is complete;
      bus controller means coupled to said DMA controller means and said micro-controller means for implementing a memory data transfer request from said DMA controller means and said micro-controller means; and
      device controller means coupled to said DMA controller means and said micro-controller means for receiving and responding to said command signals from said micro-controller means, transferring long streams of said data to and from said DMA controller means, and generating and returning said completion status to said micro-controller means after said transfer is complete.

2. A system for implementing peripheral device bus mastering in accordance with claim 1 wherein said device controller means is able to handle a multiple of memory buffers for a single data transfer.

3. A system for implementing peripheral device bus mastering in accordance with claim 2 wherein a host CPU is able to dynamically add transfer requests.

4. A system for implementing peripheral device bus mastering in accordance with claim 3 wherein said device controller means is an Integrated Drive Electronics (IDE) hard disk controller.

5. A system for implementing peripheral device bus mastering in accordance with claim 1 wherein said device controller means interfaces with said peripheral device over a parallel bus.

6. A system for implementing peripheral device bus mastering in accordance with claim 5 wherein said device controller means interfaces with a plurality of peripheral devices over a parallel bus.

7. A system for implementing peripheral device bus mastering in accordance with claim 6 wherein each of said plurality of peripheral devices appear to said system as an independent data path.

8. A system for implementing peripheral device bus mastering in accordance with claim 7 wherein said device controller means is an Extended Capabilities Port (ECP) parallel port controller.

9. A system for implementing peripheral device bus mastering in accordance with claim 1 wherein said micro-controller means is an embedded micro-controller located within said mobile computer system.

10. A system for implementing peripheral device bus mastering in accordance with claim 1 further comprising data buffer descriptor means created in said memory of said mobile computer system for describing a data transfer that said micro-controller means initiates, controls, and completes.

11. A system for implementing peripheral device bus mastering in accordance with claim 1 wherein said DMA controller means is implemented as a distributed DMA target slice.

12. A method for implementing a system for peripheral device bus mastering in a mobile computer system comprising the steps of:

providing a mobile computer system;

providing Direct Memory Access (DMA) controller means coupled to said mobile computer system for transferring data to and from memory of said mobile computer system;

providing micro-controller means coupled to said DMA controller means for programming said DMA controller means, generating and sending command signals, and receiving completion status after said transfer of data is complete;

providing bus controller means coupled to said DMA controller means and said micro-controller means for implementing a memory data transfer request from said DMA controller means and said micro-controller means; and providing device controller means coupled to said DMA controller means and said micro-controller means for receiving and responding to said command signals from said micro-controller means, transferring long streams of said data to and from said DMA controller means, and generating and returning said completion status to said micro-controller means after said transfer is complete.

13. The method of claim 12 wherein said step of providing device controller means further comprises the step of providing a device controller means that is able to handle a multiple of memory buffers for a single data transfer and is able to support dynamically added transfer requests.

14. The method of claim 13 wherein said step of providing device controller means further comprises the step of providing an Integrated Drive Electronics (IDE) hard disk controller.

15. The method of claim 12 wherein said step of providing device controller means further comprises the step of providing device controller means which interfaces with peripheral devices over a parallel bus.

16. The method of claim 15 wherein said step of providing device controller means further comprises the step of providing device controller means wherein each of said peripheral devices appear to said system as an independent data path.

17. The method of claim 16 wherein said step of providing device controller means further comprises the step of providing an Extended Capabilities Port (ECP) parallel port controller.

18. The method of claim 12 wherein said step of providing DMA controller means further comprises the step of implementing said DMA controller means as a distributed DMA target slice.

19. The method of claim 12 wherein said step of providing micro-controller means further comprises the step of providing an embedded micro-controller located within said mobile computer system.

20. The method of claim 12 further comprising the step of providing data buffer descriptor means created in said memory of said mobile computer system for describing a data transfer that said micro-controller means initiates, controls, and completes.

* * * * *